US011411742B2

(12) United States Patent
Nicolas et al.

(10) Patent No.: US 11,411,742 B2
(45) Date of Patent: Aug. 9, 2022

(54) PRIVATE SET CALCULATION USING PRIVATE INTERSECTION AND CALCULATION, AND APPLICATIONS THEREOF

(71) Applicant: QED-IT SYSTEMS LTD., Tel Aviv-Jaffa (IL)

(72) Inventors: Aurélien Renaud François Nicolas, Berlin (DE); Pablo Kogan, Ramat (IL); Daniel Messod Benarroch Guenun, Rehovot (IL); Arbel Deutsch Peled, Tel Aviv (IL); Ori Wallenstein, Raanana (IL)

(73) Assignee: QED-IT SYSTEMS LTD., Tel Aviv-Jaffa (IL)

( * ) Notice: Subject to any disclaimer, the term of this patent is extended or adjusted under 35 U.S.C. 154(b) by 0 days.

(21) Appl. No.: 17/014,455

(22) Filed: Sep. 8, 2020

(65) Prior Publication Data

US 2022/0078023 A1    Mar. 10, 2022

(51) Int. Cl.
| H04L 29/06 | (2006.01) |
| H04L 9/32 | (2006.01) |
| G06F 21/60 | (2013.01) |
| H04L 9/00 | (2022.01) |
| G06F 21/64 | (2013.01) |
| H04L 9/14 | (2006.01) |
| H04L 9/30 | (2006.01) |

(52) U.S. Cl.
CPC .......... *H04L 9/3242* (2013.01); *G06F 21/602* (2013.01); *G06F 21/64* (2013.01); *H04L 9/008* (2013.01); *H04L 9/14* (2013.01); *H04L 9/30* (2013.01); *H04L 9/3221* (2013.01)

(58) Field of Classification Search
CPC . H04L 9/00; H04L 9/3242; H04L 9/14; H04L 9/30; H04L 9/008; H04L 9/3221; H04W 12/00; G06F 21/00; G06F 21/64; G06F 21/602
See application file for complete search history.

(56) References Cited

U.S. PATENT DOCUMENTS

| 8,843,997 B1 * | 9/2014 | Hare | H04L 63/0815 726/3 |
| 10,878,108 B1 * | 12/2020 | Nicolas | G06F 21/602 |
| 2016/0140348 A1 * | 5/2016 | Nawaz | G06F 21/602 726/26 |

\* cited by examiner

*Primary Examiner* — Joseph P Hirl
*Assistant Examiner* — Leynna Truvan
(74) *Attorney, Agent, or Firm* — Sterne, Kessler, Goldstein & Fox P.L.L.C.

(57) ABSTRACT

Embodiments disclosed herein describe computing calculations based on two overlapping private sets between various parties. To conduct the calculation, an intersection of the overlapping private sets data lists is conducted without revealing the underlying data. A homomorphic encryption is conducted on the intersecting data elements to allow them to be compared.

22 Claims, 8 Drawing Sheets

PRIVATE SET CALCULATION USING PRIVATE INTERSECTION AND CALCULATION, AND APPLICATIONS THEREOF

BACKGROUND

Field

The present disclosure relates generally to identifying common elements between at least two data sets.

Related Art

Many situations exist where companies or individuals want to determine compliance with a policy where another party keeps, in secret, the data needed to determine compliance with the policy. For example, loan stacking is when a borrower applies for and receives approval on several loans that together exceed the borrower's total credit limit Because the loans were issued at different financial institutions that each keep their borrower and applicant information confidential, the financial institutions may not detect that the borrower is exceeding his or her credit limit, and issue the loans in violation of their own policies.

Similarly, individuals may try to take out multiple insurance policies with different institutions, each policy covering the same event, like a death. Each financial institution may have a limit on how much in total to insure a life for so that a person does not become overinsured. But, because the financial institutions keep their insured and applicant information confidential, they may not detect that limits have been exceeded, at least until a claim has been paid.

To deal with this, sometimes companies provide their confidential information to third parties, such as accounting firms like Deloitte or EY. These third parties can view the data and disclose any data in common to the various companies without revealing any confidential information to one another. However, this can be expensive.

Software programming techniques are available for determining which data records overlap without disclosing the underlying data. For example, both parties may apply a cryptographic hash to their data records and compare the resulting hash values. A hash function is any function that can be used to map data of arbitrary size to fixed-size values. A cryptographic hash is a hash function that is one-way—that is, a function which is essentially infeasible to invert, or infeasible to invert without a private key. Examples of cryptographic hash functions include SHA-256, SHA-3, Blake2 family, and MiMC.

However, hash functions—even cryptographic hash functions—can be vulnerable to a brute force attack. For example, for things like customer lists, there may be only a few million possibilities. By simply trying out all of the possibilities, eventually a customer corresponding to a hash can be identified.

To deal with this, a hash algorithm may use a cryptographic key to add entropy to the data sets being hashed. For example, a salt value may be added or a key may be added to what is hashed. Because the salt value or key adds many more possibilities, this technique may make brute force attacks difficult or impossible. However, the key value still needs to be managed, and there is a risk that the key will be stolen.

Various algorithms are available that deal with these issues. For example, techniques are described in:

Kolesnikov et al., "Efficient Batched Oblivious PRF with Applications to Private Set Intersection," *23rd ACM Conference on Computer and Communications Security*, October 2016;

Pinkas et al., "Efficient Circuit-based PSI with Linear Communication," *Eurocrypt*, April 2019; and Falk et al., "Private Set Intersection with Linear Communication from General Assumptions," *Workshop on Privacy in the Electronic Society*, November 2019.

Hashing alone does not generally allow you to conduct calculations on the hashed data. Homomorphic encryption, on the other hand, is a form of encryption allowing one to perform calculations on encrypted data without decrypting it first. The result of the computation is in an encrypted form; when decrypted the output is the same as if the operations had been performed on unencrypted data. Examples of homomorphic encryption schemes are described, for example, in:

Brakerski, et al., "Fully Homomorphic Encryption without Bootstrapping," *ITCS '12: Proceedings of the Innovations in Theoretical Computer Science*, January 2012;

López-Alt, et al., "On-the-Fly Multiparty Computation on the Cloud via Multikey Fully Homomorphic Encryption," *Proceedings of the Annual ACM Symposium on Theory of Computing*, May 2012;

Gentry, et al., "Homomorphic Encryption from Learning with Errors: Conceptually-Simpler, Asymptotically-Faster, Attribute-Based," *CRYPTO* 2013, June 2013; and Brakerski, et al., "Lattice-Based FHE as Secure as PKE," *ITCS '14: Proceedings of the 5th Conference on Innovations in Theoretical Computer Science*, January 2014.

Many of the available algorithms for keyed hashing and homomorphic encryption require multiple interactions between the various participants. These multiple interactions can reduce computational efficiency. Moreover, they may require each party to have a dedicated server online to execute a portion of the interaction. Again, this adds cost and burden.

In this manner, new systems and methods are needed for private set intersection that are computationally efficient and secure.

BRIEF SUMMARY

In an embodiment, a method conducts a calculation on records of two private data sets. Each of the data sets include a plurality of records. Each record includes a metadata identifier and a corresponding value. A keyed hash value is determined for a metadata identifier of the record for each record of a first plurality of data records for a first participant. And, a keyed hash value is determined for a metadata identifier of the record for each record of a second plurality of data records for a second participant. The determined keyed hash values are compared to identify a first data record from the first plurality of data records and a second data record from the second plurality of data records such that the identified first and second data records have a common metadata identifier. A first value for the first data record is homomorphically encrypted to determine a first homomorphically encrypted value. And, a second value for the second data record is homomorphically encrypted to determine a second homomorphically encrypted value. Based on the first and second homomorphically encrypted values, an encrypted result is homomorphically calculated. The encrypted result for the first participant is used to determine a calculated value for the first participant to evaluate without needing knowledge of the second value.

In some embodiments, a non-transitory, computer-readable device is disclosed, the non-transitory, computer-readable device may have instructions stored thereon that, when executed by at least one computing device, may cause the at least one computing device to perform the computer-implemented method described above.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Embodiments disclosed herein describe using computing calculations based on two overlapping private sets between various parties. To conduct the calculation, an intersection of the overlapping private sets data lists is conducted without revealing the underlying data. A homomorphic encryption is conducted on the intersecting data elements to allow them to be aggregated.

In some embodiments, the calculations are performed using delegation to other devices and in one round of interaction (request and response). The various parties involved, and their associated computing devices, are referred to herein as participants. The protocol completely hides the data of participants from an eavesdropper. Because the protocol only uses a single round of interaction to determine which rows are overlapping, it is more efficient and does not require each participant to have servers that remain online continuously.

Figure 1:
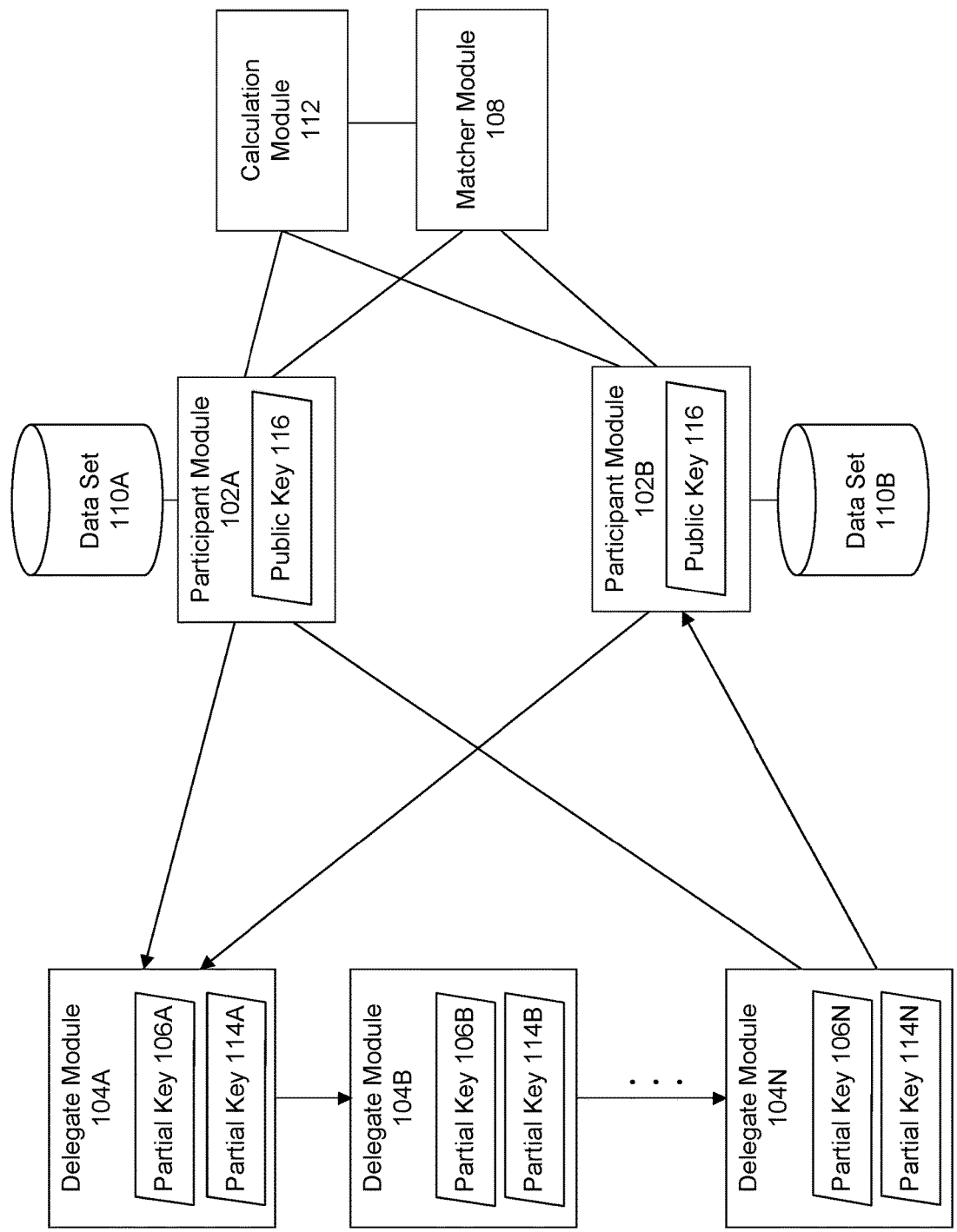
FIG. 1 depicts a system that uses delegate modules to securely and efficiently determine which portion of two data sets intersect and to conduct a homomorphic calculation on the interesting portion, according to an embodiment.

FIG. 1 depicts a system 100 that uses delegate modules to securely and efficiently determine which portion of two data sets intersect and to conduct homomorphic calculations on overlapping data sets, according to an embodiment. System 100 includes participant modules 102A-B, matcher module 108, calculation module 112, and delegate modules 104A . . . N. Each of these components are described in turn and operation of system 100 is described below with respect to FIG. 2.

Participant modules 102A-B are each modules corresponding to a party with private data that needs to be cross-referenced with that of other parties. For example, participant modules 102A and B may correspond to participants that would like to determine which data they have in common without sharing their respective data. Private data is stored in respective data sets 110A-B. Parties are responsible only for their own data and security. In other words, data set 110A is private to participant module 102A, and data set 110B is private to participant module 102B. While two participants are shown for simplicity, a skilled artisan would recognize that any number of participants can be present.

As mentioned above, data sets 110A-B are secret and private to their respective participants 104A-B. As described above, examples could be customer lists or insurance claims data. Each of data sets 110A-B may include records, and each record may be identified with a record identifier. While the record may be secret, the record identifier may not be.

The record itself can include a value and an identifier to identify what the value pertains to. This metadata identifier may, for example, identify the individual (e.g., person or entity) the value describes. In different examples, the value may be the amount the individual is seeking in a loan or in insurance. The individual identifies the individual in a way common to the participants. The metadata identifier may be a unique numerical identifier such as a social security number, Tax ID number, or driver's license number. In other embodiments, the metadata identifier may be a phone number or email address. In some further embodiments, the individual's name may be used as the metadata identifier.

In other examples, the metadata identifier may be a field—other aspects of the record. For example, it can be an individual's state, age, or gender. It could be related to an object that the value of a record describes. For example, the record may describe a diamond and it may include a price in the record's value, and the record may include grading information (color, clarity, cut, and carat weight) as metadata identifiers.

Each of participant modules 102A-B have a copy of public key 116. Public key 116 corresponds to the combination of partial keys 114A-N which together form a virtual private key. Participant modules 102A-B use public key 116 to homomorphically encrypt values later used for calculation by calculation module 112. After the calculation is conducted, as will be described in greater detail below expect FIG. 4, delegate modules 104A-N each use their respective partial keys 114A-N to partially decrypt the result of the calculation.

As will be also described in greater detail with respect to FIG. 1, participant modules 102A-B may send randomized versions of their metadata identifiers to delegate modules 104A-N to determine keyed hash values for matching by matcher module 108. Delegate modules 104A-N each have a partial key 106A-N. The collective partial keys 106A-N make up a virtual private key used to make the keyed hash value. Each delegate module 104A-N is responsible for safeguarding its own respective partial key 106A-N.

For both partial keys 106A-N and partial keys 114A-N, because no single delegate module 104A-N has the entire virtual key, if any one of the delegate modules 104A-N is compromised, an attacker would be unable to steal the entire key and decipher private data of a participant. This reduces the risk of a data breach.

The number of delegate modules 104A-N may be configurable such that a larger number of delegate modules 104A-N may reduce risk of a data breach, because reconstructing the virtual key would require an attacker to breach all of them.

A set up process may be needed to initiate private keys 106A-N and 114A-N in their respective delegate modules 104A-N. In other words, before system 100 can function properly, delegate modules 104A-N need to determine one or more secret keys $k_1$ (for hashing) and $k_2$ (for homomorphic decryption) for the system. However, none of them (indeed, no one whatsoever) should know this key. Delegate modules 104A-N determine private keys 106A-N and private keys 114A-N, and hence secret keys $k_1$ and $k_2$, by performing a sample field element, and that would be their own share of the key.

Once delegate modules 104A-N are set up, they can receive data from participant modules 102A-B and compute corresponding keyed hash values. The data may be the metadata identifiers for the records. To compute the keyed hash values, delegate modules 104A-N form a chain and each applies its corresponding partial key 106A-N. This may be done in order. Alternatively, if the function to apply the corresponding partial key 106A-N is commutative, this can be done in any order arbitrarily. Once all delegate modules 104A-N have applied their corresponding partial keys 106A-N, the resulting key-hashed value is returned to the participant modules 102A-B from which the data record originated.

Similarly, to homomorphically decrypt a calculated value, delegate modules 104A-N form a chain and each applies its corresponding partial key 114A-N. This may involve a multi-party computation conducted in concert by delegate modules 104A-N. This may be done in order. Alternatively, if the function to apply the corresponding partial keys 114A-N is commutative, this can be done in any order arbitrarily. In an embodiment, the partial decryption is such that the delegate modules 104A-N switch the key under which they encrypt the partially decrypted values. Once all delegate modules 104A-N have applied their corresponding partial keys 114A-N, the resulting value is returned to the participant module 102A-B. When returned to the respective participant module 102A-B, the value may still be encrypted with a key corresponding to the respective participant module 102A-B that the value is returned to. Upon receipt of the value, the participant module 102A-B each decrypts with its respective private key to evaluate whether the value is in compliance with their policy rule.

As mentioned above, the participants may randomize the metadata identifiers in their records before sending them to delegate modules 104A-N—for example, sampling a random number and exponentiation values generated based on their records with the random number. When a resulting keyed hash value is returned from delegate modules 104A-N, the keyed hash value is de-randomized. For example, the keyed hash value may be exponentiating by an inverse of the random number. In this way, the records are kept secret from delegate modules 104A-N. In another embodiment, the various delegate modules 104A-N and matcher module 108 (and possibly participant module 102A-B) may incrementally de-randomize the number as described below with respect to FIG. 7. In addition, because the keyed hash value was generated by separate delegate modules 104A-N, participant modules 102A-B are not exposed to nor required to persist volatile cryptographic keys.

Matcher module 108 performs the set intersection. Matcher module 108 is centralized and need not be trusted because it only receives the de-randomized keyed hash values from participant modules 102A and 102B. The values received at matcher module 108 are already hashed in a way that makes a brute force attack impossible. For that reason, matcher module 108 need not be trusted by either party.

Once both participant modules 102A and 102B provide their de-randomized keyed hash values, matcher module 108 compares all the various keyed hash metadata identifiers and returns record identifiers corresponding with the records that match to both participant modules 102A and 102B. This is possible because the keyed hash values are keyed using the same key—given the deterministic nature of cryptographic hash functions, two data values will yield the same keyed hash value. In this way, matcher module 108 conducts private set intersection. If participant module 102A provides matcher module 108 with its values before participant module 102B, participant modules 102A needs only wait for participant module 102B to provide its keyed hash values before receiving the intersection data from matcher module 108.

Once matcher module 108 has returned the record identifiers corresponding with the records that match within participant modules 102A and 102B, participant modules 102A and 102B will know which records they have in common. Then, they can initiate the steps needed to conduct a homomorphic calculation on the common records. In particular, participant modules 102A and 102B look up the values corresponding to the matching record identifiers from their respective data sets 110A and B. Participant modules 102A and 102B homomorphically encrypt the retrieved values using public key 116. Then, participant modules 102A and 102B transmit the encrypted values to calculation module 112.

Calculation module 112 homomorphically conducts a calculation on the encrypted values received from participant modules 102A-B. Then, either directly from calculation module 112 or via participant modules 102A-B, the resulting value is decrypted by delegate modules 104A-N. The decryption may occur, for example, by having each delegate module 104A-N exponentiate the value calculated by calculation module 112 with its respective partial key 114A-N. Finally, the value is returned to participant modules 102A-B, which applies its own private key. Participant module 102A-N can then use the value to determine whether the decrypted value complies with its policy rule. In this way, participant modules 102A-N can conduct an evaluation of whether the individual described in data sets 110A-B complies with policy rules without needing to share data sets 110A-B with each other.

While the system in FIG. 1 shows two participant modules 102A-B, a skilled artisan would recognize that it could be extended to any number of participants. Preferably, there are at least three participants to further conceal what values the other participants may have in their respective data sets.

Figure 2:
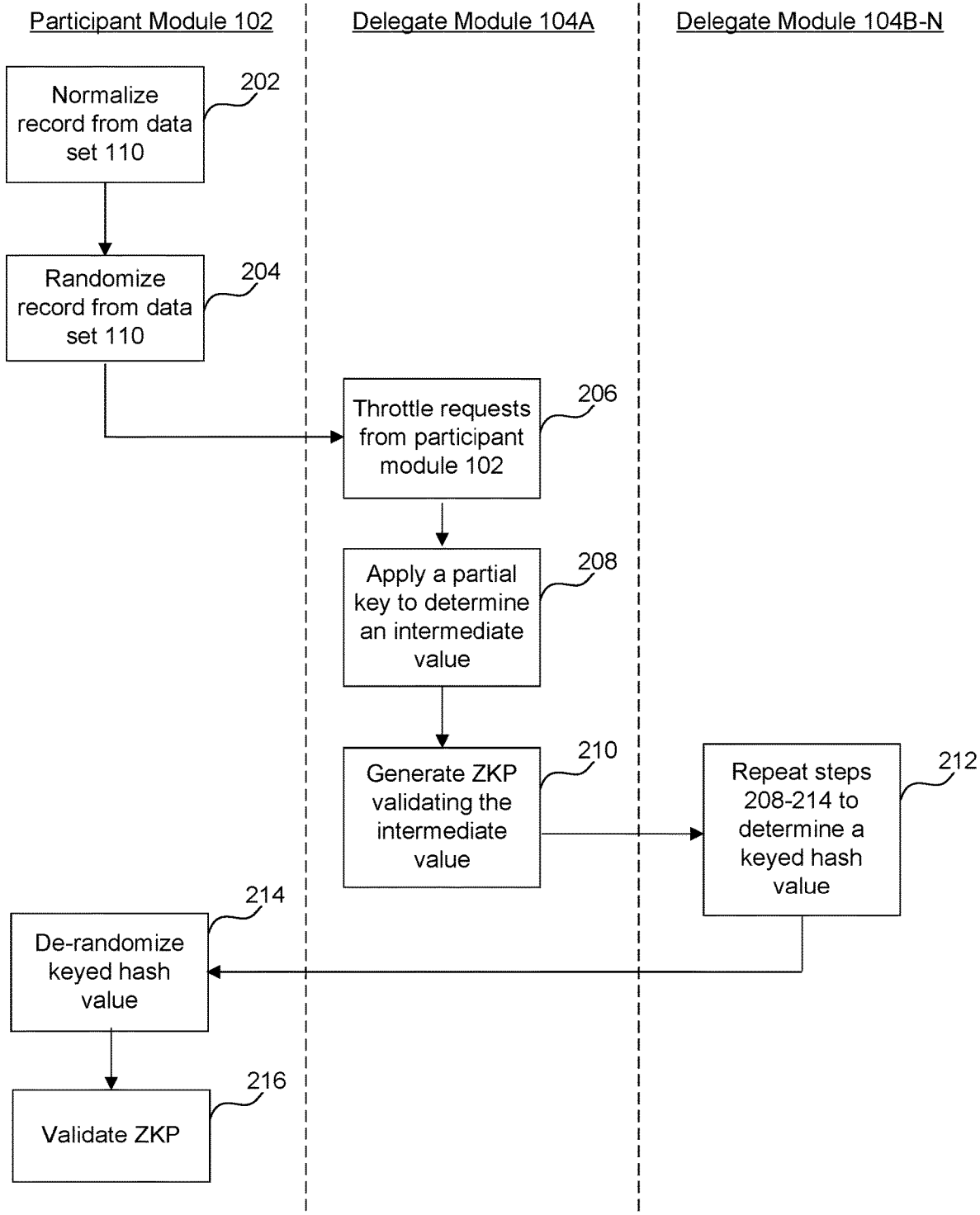
FIG. 2 depicts a method for determining a keyed hash value that may be used in the operation of the system of FIG. 1, according to an embodiment.

FIG. 2 depicts a method 200 for determining a keyed hash value that may be used in the operation of the system of FIG. 1, according to an embodiment.

Method 200 begins at step 202, when participant module 102 normalizes its data records and its corresponding data set 110. Each participant may represent data in a somewhat different format. Normalization is the process of transforming the input data into a common form. This normalization process may be coordinated between the different participants, who must all follow the same format. Without this step, the resulting hash values may end up not matching, even if the underlying data is the same. For example, the date Oct. 1, 2019 can be written as 10/1/19, 10/01/2019, 01/10/19, Oct. 1, 2019. Although 10/1/19 and 10/01/2019 refer to the same date, the resulting hashes of these inputs will be completely different and could not be matched by the matcher. Thus a normalization process can turn both dates into a common format of DD/MM/YYYY. Now both dates will yield the same hash which will allow the matcher to identify the match.

The normalization may be done according to the type of data that exists within the particular column in the data set and the amount of variance in its formatting. For example, names can be normalized by removing diacritics and whitespace. Addresses can be translated to geographic latitude/longitude coordinates, keeping just the beginning significant digits of each coordinate to account for variations in the geocoding. Country names can be translated into country codes. Dates and timestamps can be transformed into any standard format.

As mentioned above, a record may have been an associated identifier id and a private data record $x_{id}$. Normalization may be described by the equation $x_{id}$: $n_{id}$=N ($x_{id}$).

At step 204, participant module 102 randomizes the normalized value generated from a record in the data set. To randomize values, participant module 102 samples a new, different random element $r_x \leftarrow F_q$ for each data entry x. The random number may be a blinding factor.

After sampling the random number, a one-way cryptographic combination is made by combining the random number and the normalized value. In an embodiment, the cryptographic combination may be homomorphic. For example, the cryptographic combination may involve computing a hash-to-group for the entry x, $g_x$=Hash$_G$(x). Alternatively or additionally, the cryptographic validation may involve exponentiation of the normalized value with an inverse of the random number. In this way, step 204 conceals the underlying value from the delegate module.

Participant module 102 sends the randomized, normalized value to delegate module 104A and, at step 206, a delegate module 104A may throttle requests from participant module 102. By throttling requests, delegate module 104A checks to see whether the number of requests from participant module 102 during a particular timeframe exceeds a threshold. If it does, delegate module 104A may deny the request. The threshold may be set according to an expected size of the data set sought to be compared. If the number of requests received is an order of magnitude different from the expected size of the data, participant modules 102A-B may be submitting fraudulent requests and attempting to execute a brute force attack in an effort to discern a competitor's data. This throttling process serves that participant module 102 will not be able execute a brute force attack in an effort to identify competitors' data. The zero-knowledge proofs ("ZKPs") to be generated and verified in steps 210 and 216 ensure that the request allocation is not being hijacked by a nefarious party.

At step 208, delegate module 104A applies a partial key to determine an intermediate value. This may involve a one-way cryptographic operation, such as applying a collision-resistant hash function. That intermediate value is passed on between delegate machines 104A-N as each applies its respective partial key. This can also be achieved by sending the intermediate value back to the participant who will send it to the next delegate, as illustrated with respect to FIG. 6 described in greater detail below. Also, it is possible to do this with a router, or proxy, machine that will get the randomized input from the participant, send it to the delegate for hashing with the virtual private key, and then send it back to the participant, as illustrated with respect to FIG. 7 described in greater detail below. To apply the partial key, an exponentiation function may be applied. For example, if $g_0$ is the previous intermediate value, $g_1$ is the next intermediate value, and $k_1$ is the partial key, the next intermediate value may be determined by the equation $g_1 = g_0^{k_1}$.

At step 210, delegate module 104 may determine a ZKP showing that the next intermediate value was correctly calculated in step 208.

For example, the zero-knowledge proof may be generated using the zk-SNARKs, where the exponentiation function is described in the constraint system, the private key is the proving key pk, and the prior intermediate value is the verification key vk.

One example of a ZKP is the zero-knowledge succinct non-interactive argument of knowledge ("zk-SNARK"). The zk-SNARK scheme may use several algorithms including a set-up phase or key generation phase, a proving algorithm, and a verification algorithm. The set-up phase may generate a random string to generate a key and then subsequently destroy the string for security. The proving algorithm generates a proof that is relatively small in size. The size of the generated proof may be independent of the runtime of the program which results in the "succinct" naming convention. The verification algorithm may verify the proof relatively quickly in a time dependent on the size of the input and independent of the length of the computation.

The zk-SNARK cryptography may be described in the following three algorithms:

$$(pk, vk) = \text{SETUP}(CS); \tag{1}$$

$$(\pi) = \text{PROVE}(pk, public\_data, private\_data); \text{ and} \tag{2}$$

$$(\text{verified}) = \text{VERIFY}(vk, \pi, public\_data). \tag{3}$$

In these algorithms, "CS" represents a constraint system defining a non-probabilistic or nondeterministic polynomial statement. The constraint system may include the function sought to be proved. In this case, constraint system may involve the randomization function applied at step 204. Public_data may be the result of the function and private_data may be the underlying data that should remain confidential. In this example, the CS may specify that the $k_1$ used in the exponentiation of $g_1$ from $g_0$ is the same one as the random field element generated in the setup. The CS may also check that $k_1$ is the same $k_1$ that was generated during setup and/or that, when combined with the other $k_n$s, yields the cryptographic key K for the keyed hash value. Additionally or alternatively, the CS may prove that that the proof from the previous delegate verifies correctly, reducing the number of proofs that need to be verified by the participant module 102 to one. The SETUP algorithm uses the constraint system to generate a proving key ("pk") and a verification key ("vk") based on the constraint system.

The PROVE algorithm generates a proof from the proving data, the public_data, and the private data. In one example, public_data may be $g_1$ and $g_0$, and private_data may be $k_1$. The symbol $\pi$ may represent the proof itself, generated using the proving key as well as public data and private data. In some implementations, the proof $\pi$ may be only 300 bytes long. zk-SNARK may have the benefit of proving a succinct proof, regardless of the complexity of the underlying function. Such a proof may be generated at step 210.

The VERIFY algorithm uses the vk and the proof, $\pi$, to verify the correctness of the public data. The VERIFY algorithm may return a binary one or zero value indicating whether or not the public data is correct.

Figure 5:
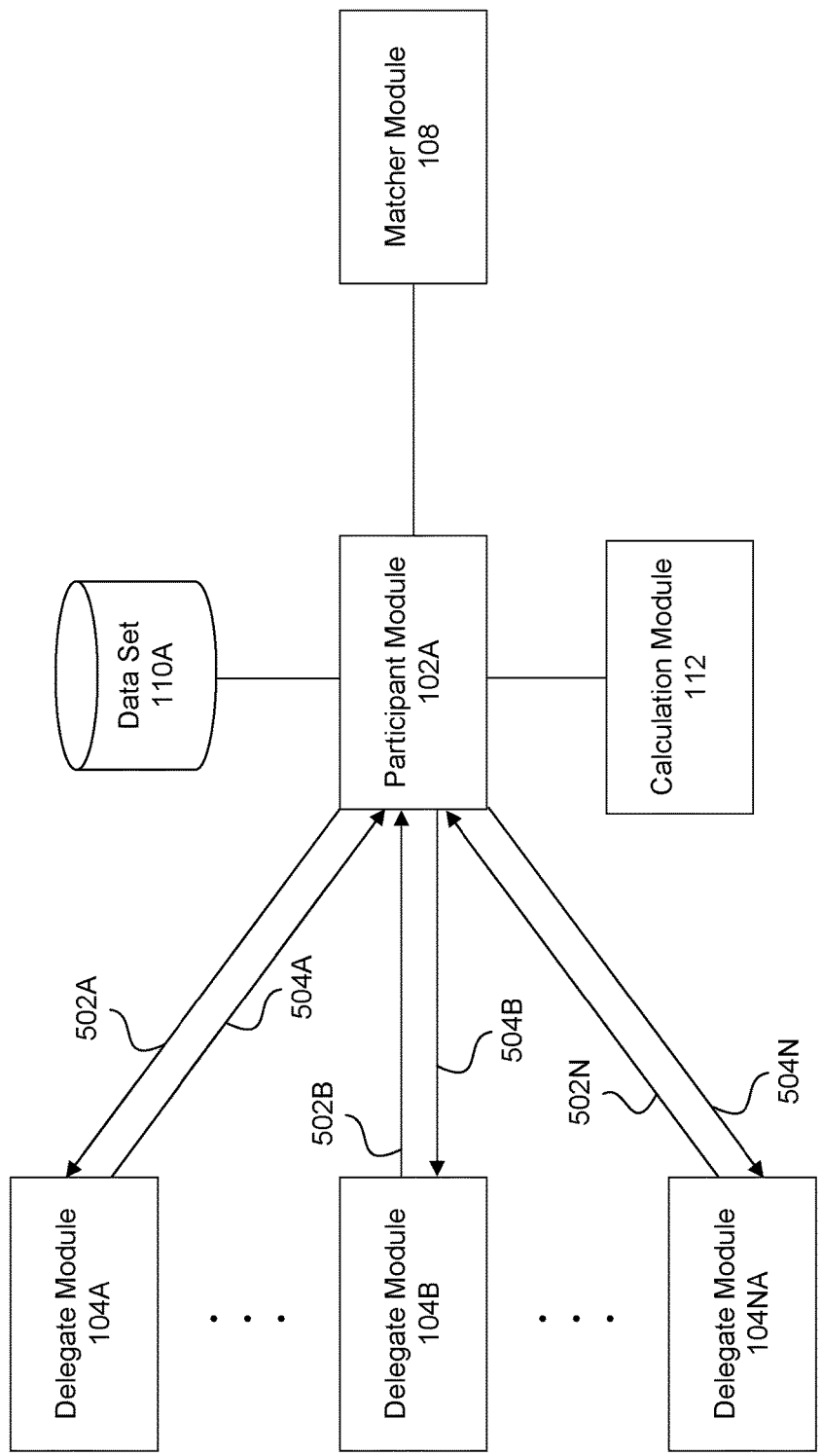
FIG. 5 depicts a system where a participant interacts with each delegate module individually.
Figure 6:
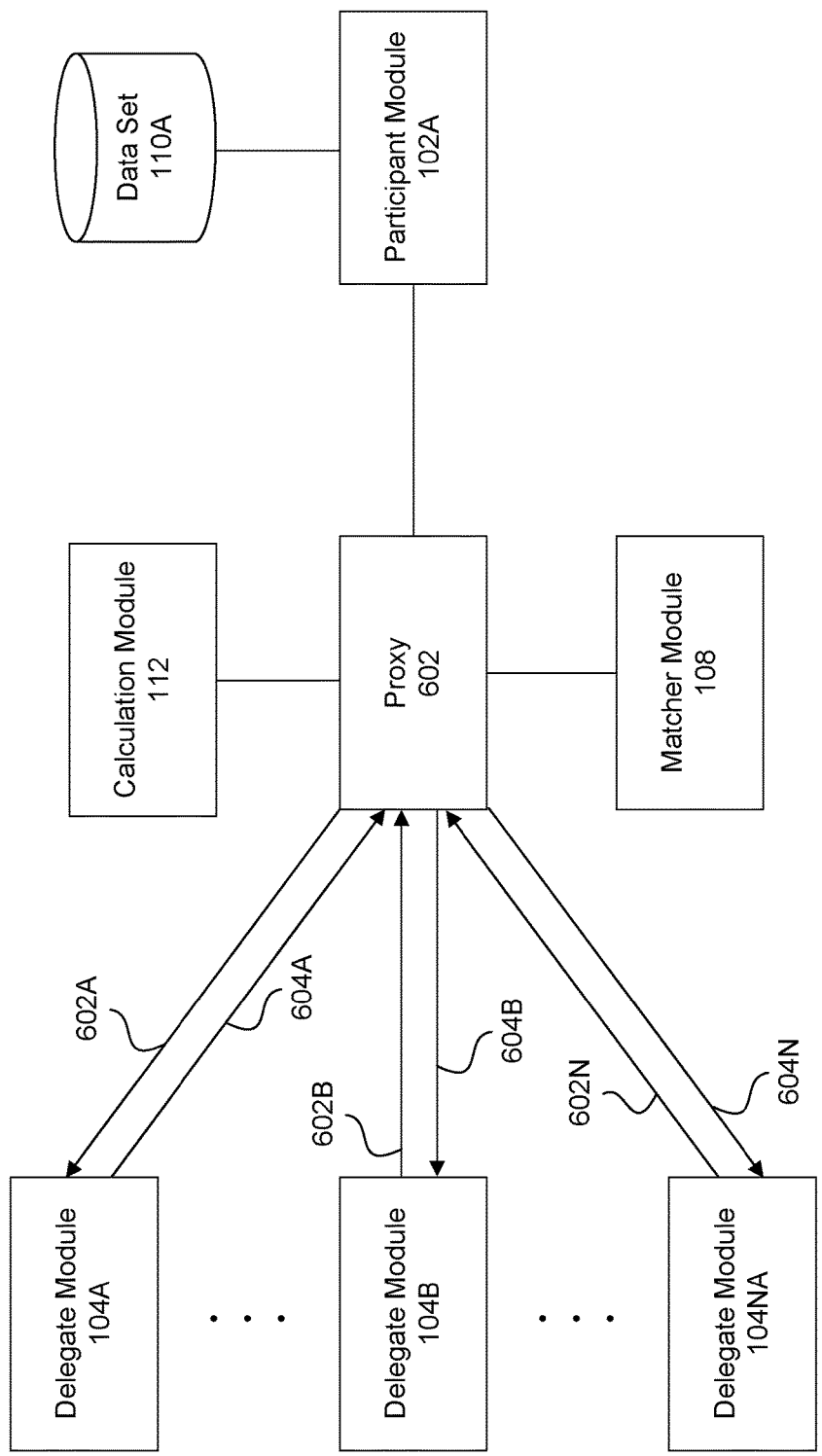
FIG. 6 depicts a system where a proxy server interacts with each delegate module and the matcher.

After generating a zero-knowledge proof and the intermediate value $g_1$, both are sent to another delegate module either directly, or via participant module 102 or a different proxy as described with respect to FIGS. 5 and 6. Delegate module 104A receives the data, and method 200 continues to step 212.

After generating the next intermediate value and possibly a zero-knowledge proof to validate the next intermediate value, at step 212 delegate module 104A transmits them to the next delegate module 104B in the chain of delegate modules 104A . . . N. The next delegate module 104B will apply its own private key in a similar manner. It may also verify the zero-knowledge proof generated by the previous delegate module 104A and generate its own zero-knowledge proof validating its exponentiation function. In this way, steps 206-210 may be repeated for each delegate module 104 in the chain of delegate modules 104A-N. Thus, a keyed hash value may be determined by the chain of delegate modules 104A-N. The final delegate module 104N returns the keyed hash value—that is, the value with all the partial private keys applied to participant module 102.

At step 214, participant module 102 de-randomizes the keyed hash value received from delegate module 104N. Participant module 102 applies to the keyed hash value an inverse of the one-way cryptographic combination applied at step 204 to remove the first random number from the first input. This will involve recall of the random number sampled in step 204. For example, if the cryptographic function applied at step 204 is an exponentiation of an inverse of a random number with the normalized record, at step 214 participant module 102 exponentiates the keyed hash value received from delegate module 104N by the sampled random number.

In this way, method 200 determines a keyed hash value that represents a record from a participant's dataset.

Figure 3:
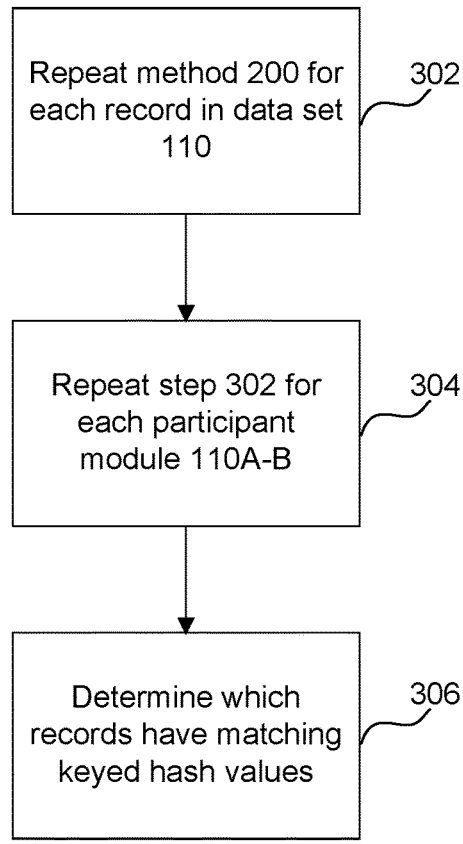
FIG. 3 depicts a method for comparing two data sets that may be used in the operation of the system of FIG. 1, according to an embodiment.

FIG. 3 depicts a method 300 for comparing two data sets that may be used in the operation of the system of FIG. 1, according to an embodiment. At step 302, method 200 from FIG. 2 is repeated for each data record. In this way, a participant module 102 generates a keyed hash value for each data record.

At step 304, method 300 repeats step 302 for each participant. In this way, each participant receives a keyed hash value for each data record in its data set. These keyed hash values are input into the matcher module, along with corresponding identifiers to track the values.

At step 306, the matcher determines which records have matching keyed hash values. The matcher receives at least two sets of input values, one for a first participant module and one for a second participant module. The matcher may compare each input value in the set of input values to every input value from the second participant. A skilled artisan would recognize that sorting and other techniques may be used to obviate the need to compare every data element. Once matching input values are identified, their corresponding record identifiers are sent to the participant modules from which they originated.

In this way, the matcher communicates to each participant the records that are overlapping between participant modules 102A-B. Participant modules 102A-B can then conduct a computation based on values in the overlapping records without sharing those records with the counterparty. This method is depicted, for example, in FIG. 4.

Figure 4:
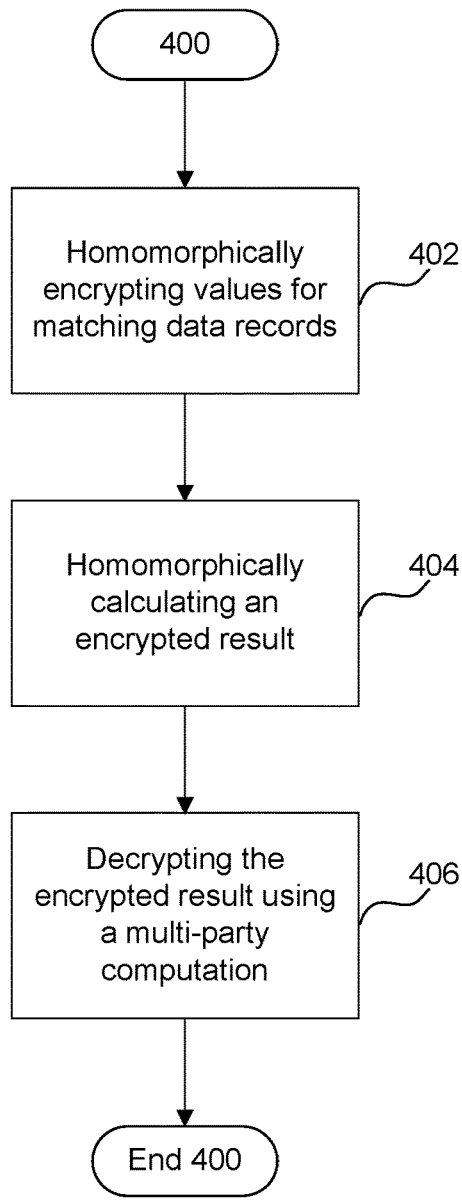
FIG. 4 depicts a method for homomorphic encryption of overlapping data sets.

FIG. 4 depicts a method 400 for homomorphic encryption of overlapping data sets. While method 400 is described with respect to components in FIG. 1, a skilled artisan would recognize they can be applied to other systems.

Method 400 starts at step 402 when the respective participants homomorphically encrypt values for the matching data records. The respective participants may conduct the homomorphic encryption using a public key. They may use the same or different public key. The public key(s) correspond to a private key used to apply partial decryption to the calculated valued in step 406.

At step 404, a calculation module homomorphically calculates, based on the homomorphically encrypted values calculated in step 402, an encrypted result. The calculation may include addition, subtraction, multiplication, (perhaps) division, or any combination thereof. For example, in cases where participants are trying to determine compliance with credit limits or insurance coverage limits, a sum of the values may be determined. In another example, where the metadata identifier identifies a characteristic of the record (e.g., gender or location of an individual, or grading information of a diamond), an average may be determined. Regardless, at step 404 the calculated result is encrypted. None of the participants are able to read or interpret the result directly.

At step 406, the encrypted, calculated result determined in 404 is decrypted. The result is decrypted using the private key corresponding to the public key used to encrypt the information in step 404. The private key may be a virtual private key combining a plurality of partial keys, each private to a respective delegate module. In that case, the decryption comprises repeatedly applying each of the plurality of partial keys. For example, a multi-party computation may be used to conduct the decryption. Each delegate module may use its respective partial key to conduct a part of the decryption operation, without disclosing that partial key to the other delegate modules.

After the delegate modules apply their respective partial keys, the calculated result is returned to the first or second participant, or both. The first or second participant may further apply its own respective private key to decrypt the calculated result. In this way, a participant can evaluate the result without needing knowledge of the second value. For example, the participant can determine whether the calculated value exceeds a threshold, such as an insurance cap or credit limit, without needing to know the values from the other participants used to calculate the sum.

In an embodiment, a zero-knowledge proof can be used to prove that any or all of the steps in FIGS. 2-4 were conducted correctly. Additionally or alternatively, a zero-knowledge proof can be used to prove the integrity of the input data. For example, a zero-knowledge proof can prove that the input values were actually from the respective participants' data sets. The zero-knowledge proof can be validated by a participant before evaluating the calculated result.

Figure 7:
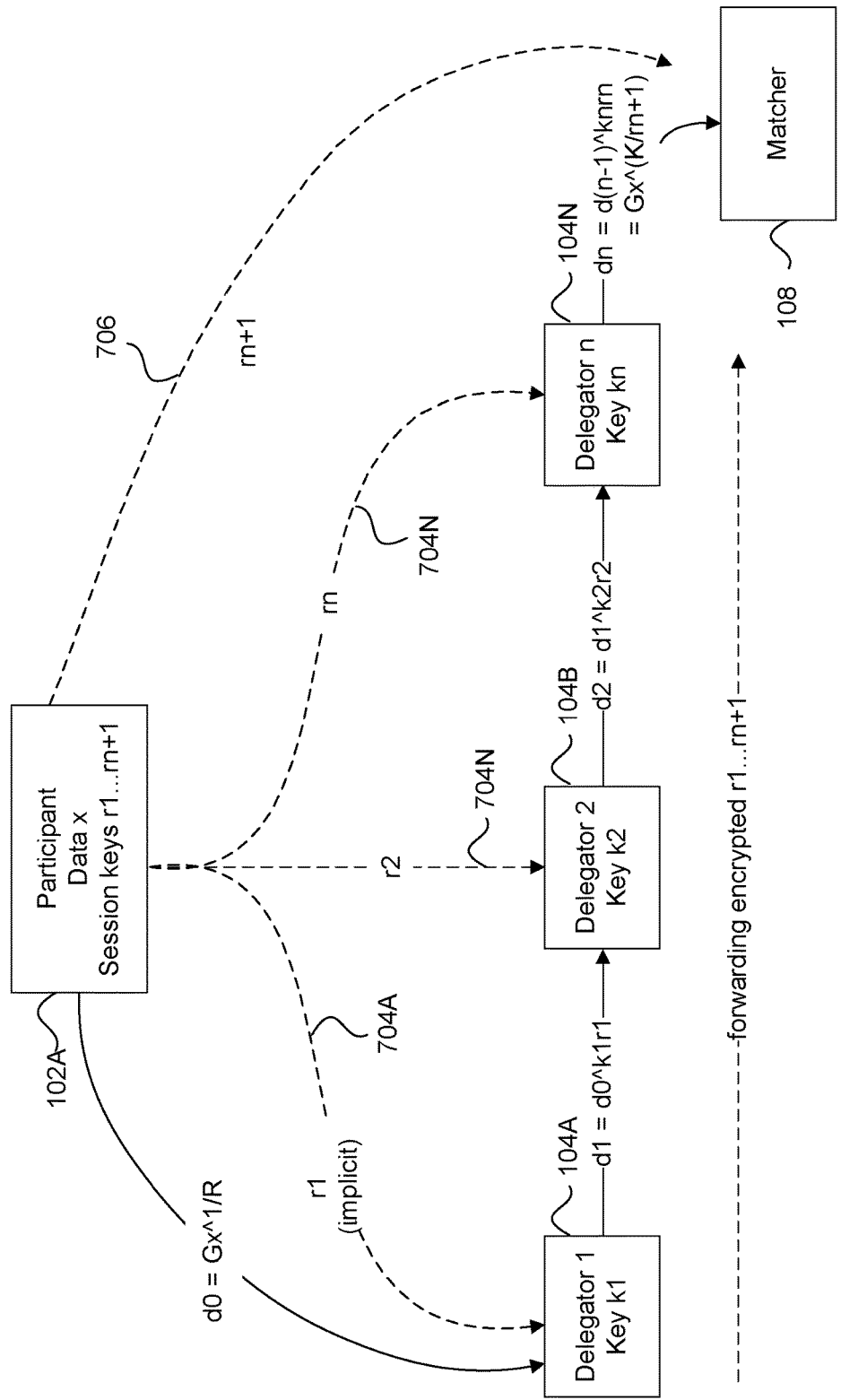
FIG. 7 depicts a system where, after a participant randomizes a record, various delegate modules incrementally de-randomize it.

FIG. 5 depicts a system 500 where a participant interacts with each delegate module individually. System 500 operates similarly to the system and methods described in FIGS. 1-4. However, instead of having delegate modules 104A-N send the intermediate value it determined to the next delegate module, delegate modules 104A-N each return the intermediate value to participant module 102A, and participant module 102A sends the intermediate value onto the next delegate module in the chain of delegate modules. While only one participant module 102A is shown in FIGS. 5-7 for simplicity, the processes described would be repeated for each participant in the private set intersection.

In the embodiment in system 500, participant module 102A sends its randomized record to delegate module 104A at 502A. Then, delegate module 104A determines an intermediate value using its partial key. As described above, delegate module 104A may also determine a zero-knowledge proof. Delegate module 104A may send both back to participant module 102A at 504A. Participant module 102A sends the intermediate value to the next delegate module, 104B, which repeats the process at 502B and 504B. The process continues for each delegate module in the chain of delegate modules to determine a keyed hash value for comparison.

As described above, after the keyed hash value is determined, participant module 102A transmits it to matcher module 108. Matcher module 108 compares the keyed hash value with those received from other participant modules. Matcher module 108 returns to participant module 102A. Participant module 102A then sends encrypted values to calculation module 112, which performs the homomorphic calculations on the encrypted value from participant module 102A and the encrypted value from other participant modules, and returns the encrypted result. Finally, participant module 102A transmits the encrypted result to the respective delegate modules 104A-N for decryption.

FIG. 6 depicts a system 600 where a proxy server 602 interacts with each delegate module and matcher module 108. System 600 operates similarly to the system and methods described in FIG. 6. However, in this embodiment, proxy server 602 acts as an intermediary between participant module 102A and delegate modules 104A-N, and perhaps matcher module 108.

In this embodiment, participant module 102A sends a randomized record to proxy server 602. As described above with respect to participant module 102A in FIG. 6, proxy server 602 sends its randomized record to delegate module 104A at 602A. Then, delegate module 104A determines an intermediate value using its partial key. As described above, delegate module 104A may also determine a zero-knowledge proof. Delegate module 104A may send both back to proxy module 602 at 604A. Proxy module 602 can validate the proof or, alternatively, send the proof to participant module 102A for validation. Proxy module 602 sends the intermediate value to the next delegate module 104B, which repeats the process at 602B and 604B. The process continues for each delegate module in the chain of delegate modules to determine a keyed hash value for comparison. When the keyed hashed value is determined, proxy 602 sends it to matcher module 108 for comparison.

Once proxy 602 transmits the keyed hash value to matcher module 108, matcher module 108 compares the keyed hash value with those received from other participant modules. Matcher module 108 returns to proxy 602. Proxy 602 then sends encrypted values to calculation module 112, which performs the homomorphic calculations on the encrypted value from participant module 102A and the encrypted values from other participant modules, and returns the encrypted result. Finally, proxy 602 transmits the encrypted result to the respective delegate modules 104A-N for at least partial decryption.

FIG. 7 depicts a system 700 where, after a participant randomizes a record, various delegate modules incrementally de-randomize it. In this embodiment, participant module 102A samples n+1 random numbers where n is the number of delegate modules. In other words, participant module 102A samples a random number $r_1 \ldots r_n$ for each of the delegate modules 104A-N and a random number $r_{n+1}$ for matcher module 108. Participant module 102A transmits each of the sampled random numbers to the respective delegate modules 104A-N and matcher module 108. Alternatively or additionally, participant module 102A may send the $r_1$ through $r_{n+1}$ random numbers encrypted such that only delegate 104A can decrypt and read only $r_1$, delegate 104B can decrypt and read only $r_2$, and so on, and matcher 108 can decrypt and read only $r_{n+1}$ These sampled random numbers may be different for each record in the data set participant module 102A wishes to compare.

Participant module 102A determines the product R of the random numbers as illustrated at 702, and the product R is the number used to randomize its record as illustrated at 708. To randomize each respective record, a randomized number is determined by exponentiating the record (or a hash of the record) by the inverse of the product R, $d_0 = G_x^{1/R}$, where $G_x$ is a hash of the private record data, R is the product of the random numbers, and $d_0$ is the randomized value. The randomized value $d_0$ is transmitted to the first delegate module 104A.

As described above with respect to FIGS. 1-5, the delegate modules 104A-N each apply their private key $k_1$-$k_n$ either by transmitting intermediate values directly between delegate modules 104A-N or by transmitting intermediate values back to participant 102A or proxy server as illustrated in FIG. 6. In addition, each delegate module 104A-N applies a respective random number $r_1 \ldots r_n$ received from participant 102A. In both cases, delegate modules 104A-N can apply the private key and random number through exponentiation. In other words, delegate module 104A determines intermediate value $d_1$ as $d_1 = d_0^{k_1 r_1}$, delegate module 104B determines intermediate value $d_2$ as $d_2 = d_1^{k_2 r_2}$, and so on for each of the delegate modules 104A-N.

Finally, the keyed hash value $d_n$ is transmitted to matcher module 108. Matcher module 108 exponentiates the keyed hash value $d_n$ by a random number that it received from participant module 102A, $r_{n+1}$. In this way, the value that matcher module 108 compares is de-randomized.

Figure 8:
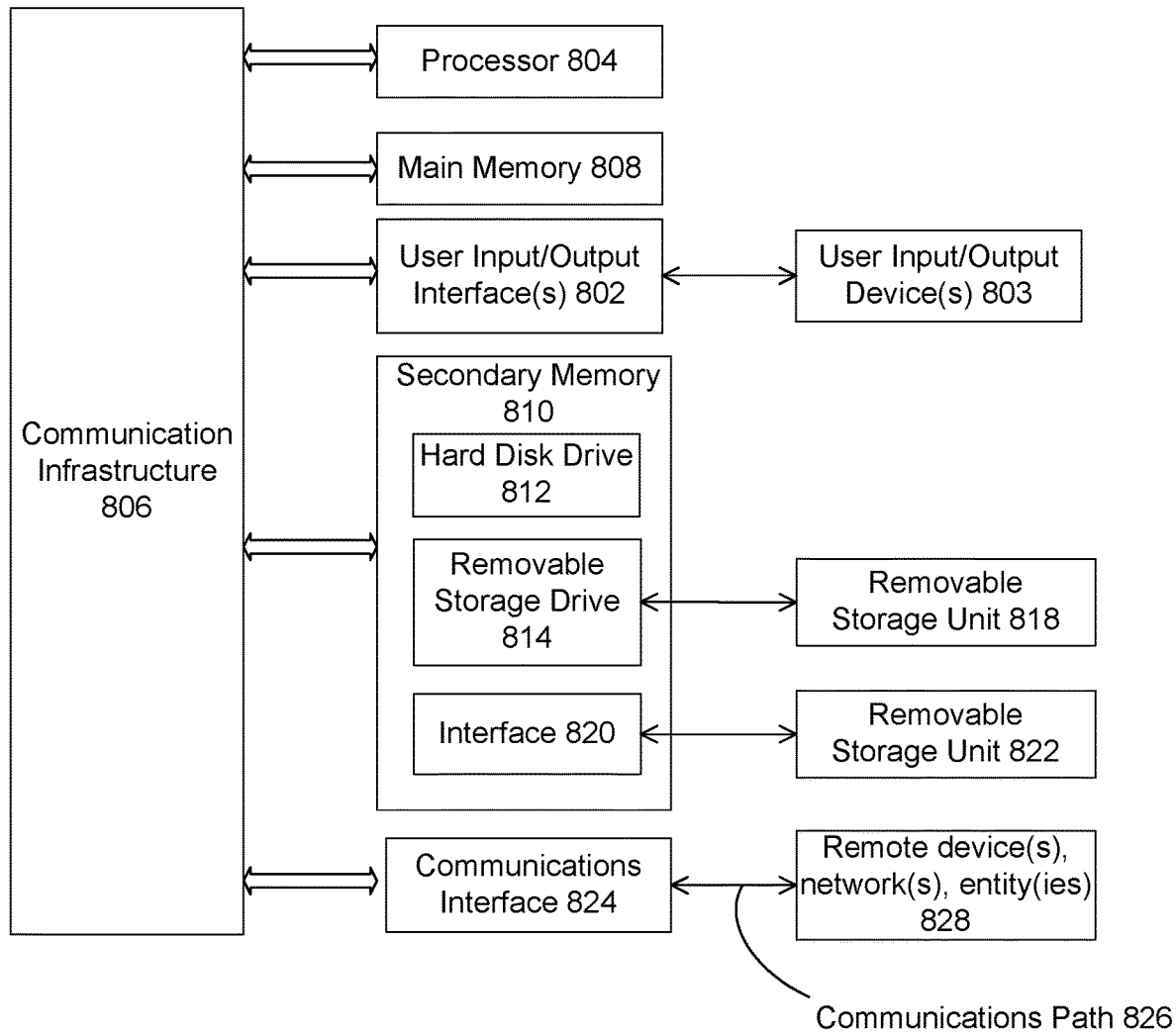
FIG. 8 depicts an example of a computer system useful for implementing various embodiments.

FIG. 8 depicts an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer-usable or readable storage device having stored thereon computer software (control logic) and/or data. Removable storage unit 818 may be a floppy disk, magnetic tape, compact disk, DVD, optical storage disk, and/or any other computer data storage device. Removable storage drive 814 may read from and/or write to removable storage unit 818.

Secondary memory 810 may include other means, devices, components, instrumentalities, or other approaches for allowing computer programs and/or other instructions and/or data to be accessed by computer system 800. Such means, devices, components, instrumentalities, or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced as reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 1100 via communication path 826.

Computer system 800 may also be any of a personal digital assistant (PDA), desktop workstation, laptop or notebook computer, netbook, tablet, smart phone, smart watch or other wearable appliance, part of the Internet-of-Things, and/or embedded system, or any combination thereof, to name a few non-limiting examples.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations, alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 8. In particular, embodiments can operate with software, hardware, and/or operating system implementations other than those described herein.

In some embodiments, a data sending system and/or a data receiving system may communicate using a digital communication network, communication infrastructure 806, etc.—for example, using a communication device such as communication interface 824. In some examples, the transaction data and/or digital signature may be read from memory, obtained from a remote electronic device (such as a web server, a computerized device, etc.), and so forth. In some examples, these values may be obtained from a blockchain. In some embodiments, the data sending system and/or data receiving system may use communication infrastructure 806 and/or communication interface 824 to communicate with a blockchain manager and/or a blockchain.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such a feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for conducting a calculation between two private data sets, each of the two data sets including a plurality of records, each record including a metadata identifier and a corresponding value, the method comprising:
    (a) for each record of a first plurality of data records for a first participant, determining a keyed hash value for a metadata identifier of the record by:
        (i) applying a first partial key corresponding to a first delegate module to the record to determine a first intermediate cryptographic value; and
        (ii) applying a second partial key corresponding to the second delegate module to the first intermediate cryptographic value to generate the keyed hash value;
    (b) for each record of a second plurality of data records for a second participant, determining a keyed hash value for a metadata identifier of the record by:
        (i) applying the first partial key corresponding to the first delegate module to the record to determine a second intermediate cryptographic value; and
        (ii) applying the second partial key corresponding to the second delegate module to the second intermediate cryptographic value to generate the keyed hash value;
    (c) comparing the keyed hash values determined in (a) and (b);
    (d) in response to the comparing, identifying a first data record from the first plurality of data records having a first keyed hash value that matches a second keyed hash value corresponding to a second data record from the second plurality of data records such that identified first and second data records have a common metadata identifier;
    (e) in response to the identifying, notifying the first participant of the first data record and the second participant of the second data record;
    (f) receiving a first homomorphically encrypted value from the first participant, wherein the first homomorphically encrypted value is generated by homomorphically encrypting a first value of the first data record;
    (g) receiving a second homomorphically encrypted value from the second participant, wherein the second homomorphically encrypted value is generated by homomorphically encrypting a second value of the second data record;
    (h) homomorphically calculating, based on the first and second homomorphically encrypted values, an encrypted result; and
    (i) decrypting the encrypted result for the first participant to determine a calculated value for the first participant to evaluate without needing knowledge of the second value.

2. The method of claim 1, wherein the homomorphically encrypting (f) and (g) occur using a public key and wherein the decrypting (i) occurs using a private key corresponding to the public key.

3. The method of claim 2, wherein the private key is a virtual private key combining a plurality of partial keys, wherein the decrypting (i) comprises repeatedly applying each of the plurality of partial keys.

4. The method of claim 3, wherein the repeatedly applying occurs by a plurality of delegate modules, each applying one of the plurality of private keys.

5. The method of claim 4, wherein the repeatedly applying occurs by the plurality of delegate modules engaging in a multi-party computation.

6. The method of claim 4, wherein the repeatedly applying occurs by the plurality of delegate modules and the first and second participant switching for the plurality of delegate modules' and the first and second participant's respective private keys.

7. The method of claim 1, wherein the homomorphically calculating in (h) comprises summing the first and second homomorphically encrypted values, and wherein the first participant determines whether the calculated value exceeds a threshold without needing to know the second value.

8. The method of claim 6, wherein the first value describes a first loan amount sought by an individual represented by the common metadata identifier with the first participant, wherein the second value describes a second loan amount sought by the individual with the second participant, and wherein the first participant determines that the calculated value exceeds a credit limit for the individual.

9. The method of claim 1, further comprising:
    (j) for each record of a third plurality of data records for a third participant, determining a keyed hash value for the metadata identifier of the record, wherein the comparing (c) comprises comparing the keyed hash values determined in (a), (b), and (j) to identify the first data record from the first plurality of data records, the second data record from the second plurality of data records, and a third data record from the third plurality of data records such that the identified first, second, and third data records have the common metadata identifier;
    (j) homomorphically encrypting a third value for the third data record to determine a third homomorphically encrypted value, wherein the calculating (h) comprises homomorphically calculating the encrypted result based on the first, second, and third homomorphically encrypted values.

10. The method of claim 1, wherein the steps (a)-(i) are orchestrated by a proxy server that receives the first plurality of data records from the first participant and the second plurality of data records from the second participant.

11. The method of claim 1, further comprising verifying a zero-knowledge proof that proves the integrity of the first and second value.

12. A non-transitory, computer-readable device having instructions stored thereon that, when executed by at least one computing device, cause the at least one computing device to perform operations for conducting a calculation between two private data sets, each of the two data sets including a plurality of records, each record including a metadata identifier and a corresponding value, the operations comprising:

(a) for each record of a first plurality of data records for a first participant, determining a keyed hash value for the metadata identifier of the record by:
  (i) applying a first partial key corresponding to a first delegate module to the record to determine a first intermediate cryptographic value; and
  (ii) applying a second partial key corresponding to the second delegate module to the first intermediate cryptographic value to generate the keyed hash value;
(b) for each record of a second plurality of data records for a second participant, determining a keyed hash value for the metadata identifier of the record by:
  (i) applying the first partial key corresponding to the first delegate module to the record to determine a second intermediate cryptographic value; and
  (ii) applying the second partial key corresponding to the second delegate module to the second intermediate cryptographic value to generate the keyed hash value;
(c) comparing the keyed hash values determined in (a) and (b);
(d) in response to the comparing, identifying a first data record from the first plurality of data records having a first keyed hash value that matches a second keyed hash value corresponding to a second data record from the second plurality of data records such that the identified first and second data records have a common metadata identifier;
(e) in response to the identifying, notifying the first participant of the first data record and the second participant of the second data record;
(f) receiving a first homomorphically encrypted value from the first participant, wherein the first homomorphically encrypted value is generated by homomorphically encrypting a first value of the first data record;
(g) receiving a second homomorphically encrypted value from the second participant, wherein the second homomorphically encrypted value is generated by homomorphically encrypting a second value of the second data record;
(h) homomorphically calculating, based on the first and second homomorphically encrypted values, an encrypted result; and
(i) decrypting the encrypted result for the first participant to determine a calculated value for the first participant to evaluate without needing knowledge of the second value.

13. The device of claim 12, wherein the homomorphically encrypting (f) and (g) occur using a public key and wherein the decrypting (i) occurs using a private key corresponding to the public key.

14. The device of claim 13, wherein the private key is a virtual private key combining a plurality of partial keys, wherein the decrypting (i) comprises repeatedly applying each of the plurality of partial keys.

15. The device of claim 14, wherein the repeatedly applying occurs by a plurality of delegate modules, each applying one of the plurality of private keys.

16. The device of claim 15, wherein the repeatedly applying occurs by the plurality of delegate modules engaging in a multi-party computation.

17. The device of claim 16, wherein the repeatedly applying occurs by the plurality of delegate modules and the first and second participant switching for the plurality of delegate modules' and the first and second participant's respective private keys.

18. The device of claim 12, wherein the homomorphically calculating in (h) comprises summing the first and second homomorphically encrypted values, and wherein the first participant determines whether the calculated value exceeds a threshold without needing to know the second value.

19. The device of claim 18, wherein the first value describes a first loan amount sought by an individual represented by the common metadata identifier with the first participant, wherein the second value describes a second loan amount sought by the individual with the second participant, and wherein the first participant determines that the calculated value exceeds a credit limit for the individual.

20. The device of claim 12, further comprising:
  (j) for each record of a third plurality of data records for a third participant, determining a keyed hash value for the metadata identifier of the record, wherein the comparing in (c) comprises comparing the keyed hash values determined in (a), (b), and (j) to identify the first data record from the first plurality of data records, the second data record from the second plurality of data records, and a third data record from the third plurality of data records such that the identified first, second, and third data records have the common metadata identifier;
  (j) homomorphically encrypting a third value for the third data record to determine a third homomorphically encrypted value, wherein the calculating (h) comprises homomorphically calculating the encrypted result based on the first, second, and third homomorphically encrypted values.

21. The device of claim 12, wherein the steps (a)-(i) are orchestrated by a proxy server that receives the first plurality of data records from the first participant and the second plurality of data records from the second participant.

22. The device of claim 12, further comprising verifying a zero-knowledge proof that proves the integrity of the first and second value.

* * * * *